(12) United States Patent
Matsuno

(10) Patent No.: US 9,283,984 B2
(45) Date of Patent: Mar. 15, 2016

(54) STEERING COLUMN ASSEMBLY

(71) Applicant: FUJI KIKO CO., LTD., Kosai-shi, Shizuoka (JP)

(72) Inventor: Mitsuyoshi Matsuno, Shizuoka (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 0 days.

(21) Appl. No.: 14/624,693

(22) Filed: Feb. 18, 2015

(65) Prior Publication Data

US 2015/0239489 A1 Aug. 27, 2015

(30) Foreign Application Priority Data

Feb. 21, 2014 (JP) ................. 2014-031768

(51) Int. Cl.
*B62D 1/184* (2006.01)
*B62D 1/189* (2006.01)
*B62D 1/187* (2006.01)

(52) U.S. Cl.
CPC ............ *B62D 1/184* (2013.01); *B62D 1/187* (2013.01); *B62D 1/189* (2013.01)

(58) Field of Classification Search
CPC ......... B62D 1/184; B62D 1/187; B62D 1/189
See application file for complete search history.

(56) References Cited

U.S. PATENT DOCUMENTS

| | | | | |
|---|---|---|---|---|
| 5,377,555 A * | 1/1995 | Hancock | ................. | B62D 1/184 74/107 |
| 5,655,413 A * | 8/1997 | Barton | ................... | B62D 1/184 4/493 |
| 2006/0219043 A1* | 10/2006 | Fujiu | ..................... | B62D 1/184 74/493 |
| 2008/0217901 A1* | 9/2008 | Olgren | ................... | B62D 1/195 280/775 |
| 2009/0066070 A1* | 3/2009 | Ueno | ....................... | B62D 1/16 280/775 |
| 2009/0173179 A1 | 7/2009 | Cymbal et al. | | |
| 2010/0326230 A1* | 12/2010 | Oh | ......................... | B62D 1/184 74/493 |
| 2011/0056324 A1* | 3/2011 | Park | ...................... | B62D 1/184 74/493 |
| 2013/0042716 A1* | 2/2013 | Davies | .................. | B62D 1/195 74/493 |
| 2013/0098194 A1* | 4/2013 | Marutani | ............... | B62D 1/183 74/493 |
| 2013/0298718 A1* | 11/2013 | Ohara | ................... | B62D 1/187 74/493 |
| 2014/0290424 A1* | 10/2014 | Kwon | ................... | B62D 1/184 74/493 |

(Continued)

FOREIGN PATENT DOCUMENTS

EP 1435317 A2 7/2004
JP 2001-322552 A 11/2001

(Continued)

OTHER PUBLICATIONS

The extended European search report issued Jul. 9, 2015 in the counterpart European patent application.

*Primary Examiner* — Barry Gooden, Jr.
(74) *Attorney, Agent, or Firm* — Marvin A. Motsenbocker; Mots Law, PLLC

(57) ABSTRACT

A steering column assembly includes a support bracket provided with a pair of side plates, a lower jacket provided with a pair of jacket side plates and pivotally coupled with the support bracket swingably about a tilt axis, an upper jacket provided with a support flange coupled with the lower jacket slidable between the pair of the jacket side plates in a telescopic direction, spacers disposed between the support flange and the pair of the jacket side plates, respectively, and a lock mechanism including a lock bolt. The lock mechanism fastens, by the lock bolt, the pair of the side plates of the support bracket to press and fix the pair of jacket side plates of the lower jacket, and to press and fix the support flange of the upper jacket via the spacers.

8 Claims, 7 Drawing Sheets

(56) References Cited

U.S. PATENT DOCUMENTS

2015/0096404 A1* 4/2015 Martinez ............... B62D 1/195
                                                        74/492
2015/0239490 A1* 8/2015 Sakata ................ B62D 1/192
                                                        74/493

FOREIGN PATENT DOCUMENTS

| JP | 2008-030542 A | 2/2008 |
| JP | 2008-195180 A | 8/2008 |
| WO | 2007/009760 A1 | 1/2007 |

* cited by examiner

STEERING COLUMN ASSEMBLY

CROSS-REFERENCE TO RELATED APPLICATIONS

The present application claims benefit of priority from Japanese Patent Application No. 2014-31768 filed in Japan on Feb. 21, 2014, which is hereby incorporated by reference.

BACKGROUND OF THE INVENTION

1. Technical Field

The present invention relates to a steering column assembly that enables of adjusting a position of a steering wheel.

2. Background Arts

A Patent Documents 1 (Japanese Patent Application Publication No. 2008-195180) and a Patent Document 2 (Japanese Patent Application Publication No. 2001-322552) disclose a steering column assembly that enables a position of a steering wheel to be adjusted.

As shown in FIG. 7, in a steering column assembly 101 disclosed in the Patent Document 1, a rickety movement of a lower jacket (an inner jacket) 112 in an upper jacket (an outer jacket) 111 in a lock state is restricted to enhance a support rigidity in the lock state. In order to restrict the rickety movement of the lower jacket 112 in the upper jacket 111, the lower jacket 112 is disposed in the inside of the upper jacket 111 on which a slit 116 is formed along its axial direction, and the upper jacket 111 is disposed between a pair of side walls 114 of a support bracket 113. When a lever 117 coupled with a lock bolt 115 penetrating through the upper jacket 111 and the support bracket 113 is operated to lock a tilt/telescopic position of the steering column assembly 101, the pair of the side walls 114 is pressed onto the upper jacket 111 to narrow a width of the slit 116. As the result, the upper jacket 111 is supported (held) tightly by the pair of side walls 114. Concurrently, the upper jacket 111 is fastened to clamp the lower jacket 112 tightly, and thereby the rickety movement of the lower jacket 112 in the upper jacket 111 is restricted.

As shown in FIG. 8, also in a steering column assembly 201 disclosed in the Patent Document 2, in order to restrict a rickety movement of a lower jacket (an inner jacket) 212 in an upper jacket (an outer tube) 211, the lower jacket 212 is disposed in the inside of the upper jacket 211, and the upper jacket 211 is disposed between a pair of side walls 214 of a support bracket 213. When a lever 217 coupled with a lock bolt 215 penetrating through coupling brackets 211A fixed to the upper jacket 211 and the support bracket 213 is operated to lock a tilt/telescopic position of the steering column assembly 201, the pair of the side walls 214 is pressed onto the coupling brackets 211A by a first cam mechanism 215A integrated between the lever 217 and the lock bolt 215. As the result, the upper jacket 211 is supported (held) tightly by the pair of side walls 214 with the coupling brackets 211A being interposed therebetween. Concurrently, a cam of a second cam mechanism 216 integrally rotatable with the lock bolt 215 pushes the lower jacket 212 onto an inner circumference of the upper jacket 211 with a cylindrical resign bush 212A being interposed therebetween. As the result, the lower jacket 212 is made stuck tightly in the upper jacket 211, and thereby the rickety movement of the lower jacket 212 in the upper jacket 211 is restricted.

SUMMARY OF THE INVENTION

When the upper jacket 111 is fastened in the steering column assembly 101 disclosed in the Patent Document 1, a fastening force applied between the upper jacket and 111 and the lower jacket 112 is unstable. This is because a deformed amount of the upper jacket 111 is large. Therefore, a spacer 118 is provided in the slit 116 in order to restrict an excessive deformation of the upper jacket 111. However, it is too difficult to configure gaps between the slit 116 and the spacer 118 so as to support the upper jacket 111 tightly by the pair of side walls 114 while restricting the rickety movement of the lower jacket 112.

When the lower jacket 212 is made stuck in the upper jacket 211 in the steering column assembly 201 disclosed in the Patent Document 2, an operation force of the lever 217 becomes large and a sufficient rigidity cannot be brought in a direction along which the lock bolt 215 extends (in a direction perpendicular to a pushing direction of the second cam mechanism 216). This is because the lower jacket 212 is made stuck by being pushed onto the inner circumference of the upper jacket 211 (with the bush 212A being interposed therebetween). Therefore, the rickety movement of the lower jacket 212 in the direction along which the lock bolt 215 extends cannot be restricted stably.

An object of the present invention is to provide a steering column assembly that can restrict a rickety movement of an upper jacket in a lower jacket and support the upper jacket tightly.

An aspect of the present invention provides an steering column assembly comprising: a support bracket that is to be fixed to a vehicle body and is provided with a pair of side plates extended vertically; a lower jacket that is provided with a pair of jacket side plates extended vertically and pivotally coupled with the support bracket so as to be supported by the support bracket swingably about a tilt axis; an upper jacket that is provided with a support flange extended parallel to the pair of jacket side plates of the lower jacket and is coupled with the lower jacket so as to be slidable between the pair of the jacket side plates in a telescopic direction extending along an axial direction of a steering shaft; spacers disposed between the support flange of the upper jacket and the pair of the jacket side plates of the lower jacket, respectively; and a lock mechanism that includes a lock bolt inserted through elongated tilt holes formed on the pair of side plates of the support bracket, through holes formed on the pair of jacket side plates of the lower jacket, and an elongated telescopic hole formed on the support flange of the upper jacket along the telescopic direction, wherein the lock mechanism fastens the pair of the side plates of the support bracket to press and fix the pair of jacket side plates of the lower jacket, and to press and fix the support flange of the upper jacket via the spacers.

According to the aspect, the pair of side plates of the support bracket, the pair of jacket side plates of the lower jacket, and the support flange of the upper jacket are pressed onto (pressed and fixed with) each other and thereby fixed with each other when the pair of side plates is fastened by the lock mechanism. Therefore, dispersion of a force required for fastening the pair of side plates can be reduced, and a force required for operating the lock mechanism can be made stable.

In addition, since the upper jacket and the lower jacket are fixed with the support bracket by being pressed onto (pressed and fixed with) each other along an axial direction of the lock bolt, a rickety movement of the upper jacket in the lower jacket can be restricted. Further, fastening rigidity of the upper jacket, the lower jacket and the support bracket in the tilt and telescopic directions can be enhanced and made stable.

It is preferable that the lower jacket is provided with a jacket top plate that connects the pair of jacket side plates, a pair of guide elements is provided between the pair of jacket side plates and the upper jacket, each of the guide elements being provided with a guide surface that is sloped so as to be slidably contacted with the upper jacket, and a width between the pair of jacket side plates is made narrower when the pair of jacket side plates is fastened by the lock mechanism to push the upper jacket onto the jacket top plate by the pair of guide elements.

In this case, the guide elements push the upper jacket onto the jacket top plate when the pair of side plates is fastened by the lock mechanism, so that a gap between the upper jacket and the lower jacket is eliminated. Therefore, the rickety movement of the upper jacket in the lower jacket can be restricted more effectively. As the result, both locking of the upper jacket and restricting the rickety movement of the upper jacket can be achieved by a simple mechanism.

It is preferable that each of the guide elements is a guide member that has a triangle prism shape and is fixed on an inner surface of the jacket side plate so as to be extended along the telescopic direction, and one of surfaces of the guide member is the guide surface that is sloped and is slidably contacted with the upper jacket on an opposite side to the jacket top plate.

In this case, the guide member(s) is provided on the pair of jacket side plate and functions as a guide rail for guiding the upper jacket along the telescopic direction. Therefore, slidability of the upper jacket can be improved, and the rickety movement of the upper jacket in the lower jacket can be restricted more effectively when the upper jacket is locked by the lock mechanism.

Alternatively, it is preferable that each of the guide elements is a guide bead that is integrally formed on the jacket side plate by a press work so as to be protruded inward and extended along the telescopic direction, and one of surfaces of the guide bead is the guide surface that is sloped and is slidably contacted with the upper jacket on an opposite side to the jacket top plate.

In this case, the guide bead(s) is integrally formed on the jacket side plate by a press work. Therefore, an assembling process (e.g. welding) of the guide elements is not needed. In addition, slidability of the upper jacket can be improved, and the rickety movement of the upper jacket in the lower jacket can be restricted more effectively when the upper jacket is locked by the lock mechanism.

Alternatively, it is preferable that each of the guide elements is a guide plate that is disposed between the jacket side plate and the support flange so as to be swingable about the lock bolt, and one of surfaces of the guide plate is the guide surface that is sloped and is slidably contacted with the upper jacket on an opposite side to the jacket top plate.

In this case, the guide plate(s) is swingable in a seesaw manner about the lock bolt. Therefore, the guide plate can swing so that its guide surface is stably contacted with the upper jacket when guiding the upper jacket along the telescopic direction. As the result, telescopic slidability of the upper jacket can be improved, and the rickety movement of the upper jacket in the lower jacket can be restricted more effectively when the upper jacket is locked by the lock mechanism.

Here, it is preferable that the guide surface is sloped curvedly as a rounded surface so as to be convex toward the upper jacket.

In this case, the guide surface(s) is sloped curvedly as a rounded surface so as to be convex toward the upper jacket. Therefore, the guide plate(s) is surely line-contacted with the upper jacket along the telescopic direction. As the result, the rickety movement of the upper jacket is restricted effectively while the guide plates push the upper jacket.

It is preferable that the steering column assembly further comprises a fastening force enhancer provided between the support flange and the spacers to enhance a fastening force for restricting the support flange from sliding in the telescopic direction while the pair of side plates is fastened by the lock mechanism.

In this case, the fastening force enhancer is provided between the support flange and the spacers, so that the fastening force enhancer can be provided without increasing a size (width) of the steering column assembly along the axial direction of the lock bolt (without increasing a distance between the pair of side plates).

Here, it is preferable that the fastening force enhancer is a friction plate that includes at least one pair of a fixed friction sheet provided with an elongated friction hole that is lined up with the elongated telescopic hole of the support flange and through which the lock bolt is inserted, and a slidable friction sheet provided with a friction through hole through which the lock bolt is inserted, the fixed friction sheet and the slidable friction sheet are stacked alternately on the support flange, and one end of the fixed friction sheet is anchored to the support flange.

In this case, fastening rigidity of the upper jacket in the telescopic direction can be easily enhanced further by using the friction plate as the fastening force enhancer.

In addition, the friction plate is disposed between the support flange and the spacer(s), so that the friction plate can be provided without increasing a size (width) of the steering column assembly along the axial direction of the lock bolt (without increasing a distance between the pair of side plates). Also it becomes possible to increase the number of the fixed and slidable friction sheets included in the friction plate without increase a size of the steering column assembly, so that the fastening rigidity of the upper jacket in the telescopic direction can be easily adjusted by adjusting the number of friction sheets to enhance the fastening rigidity further.

DESCRIPTION OF THE EMBODIMENT

Hereinafter, embodiments will be described with reference to the drawings.

First Embodiment

Figure 1:
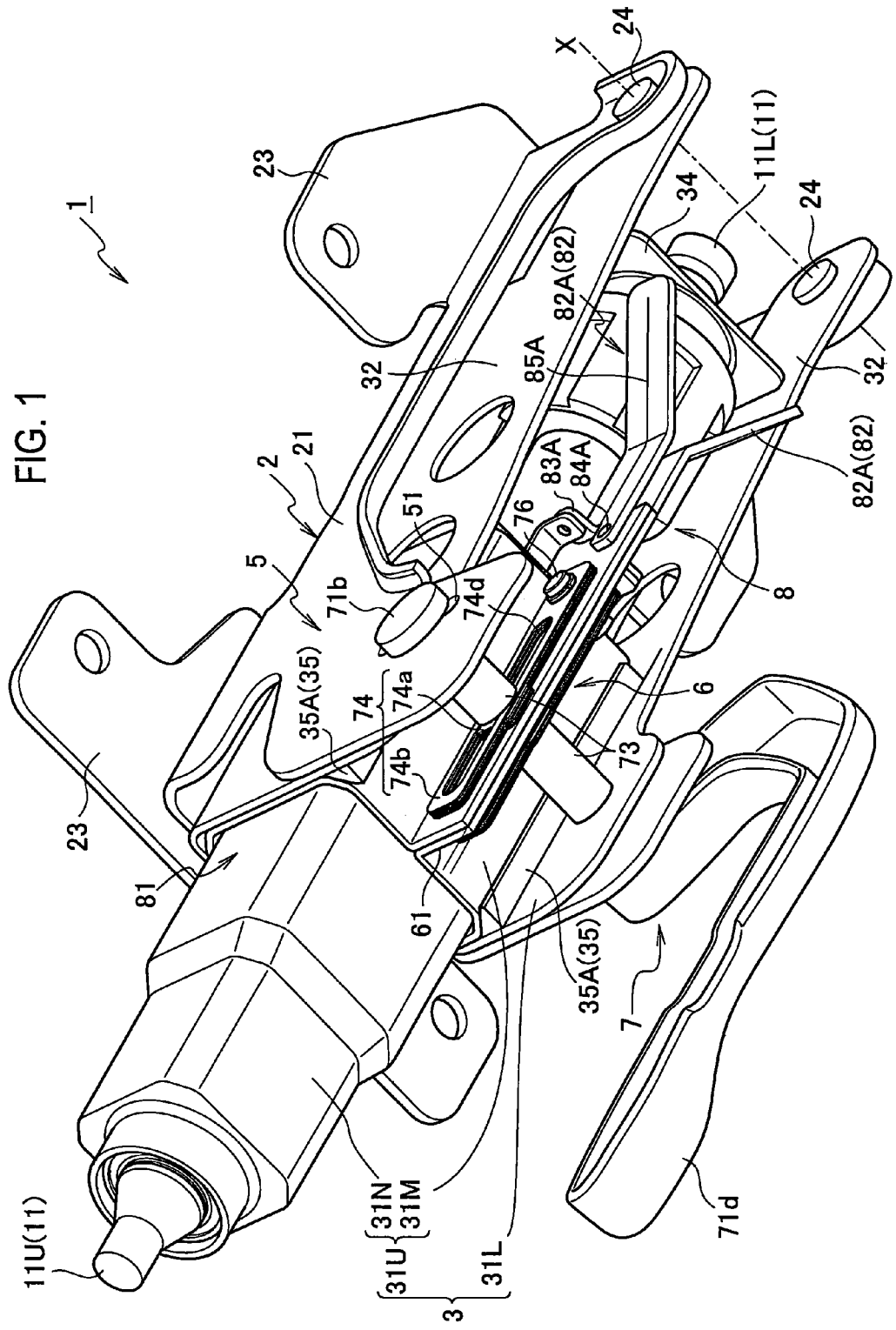
FIG. 1 is a perspective view of a steering column assembly according to a first embodiment.
Figure 2:
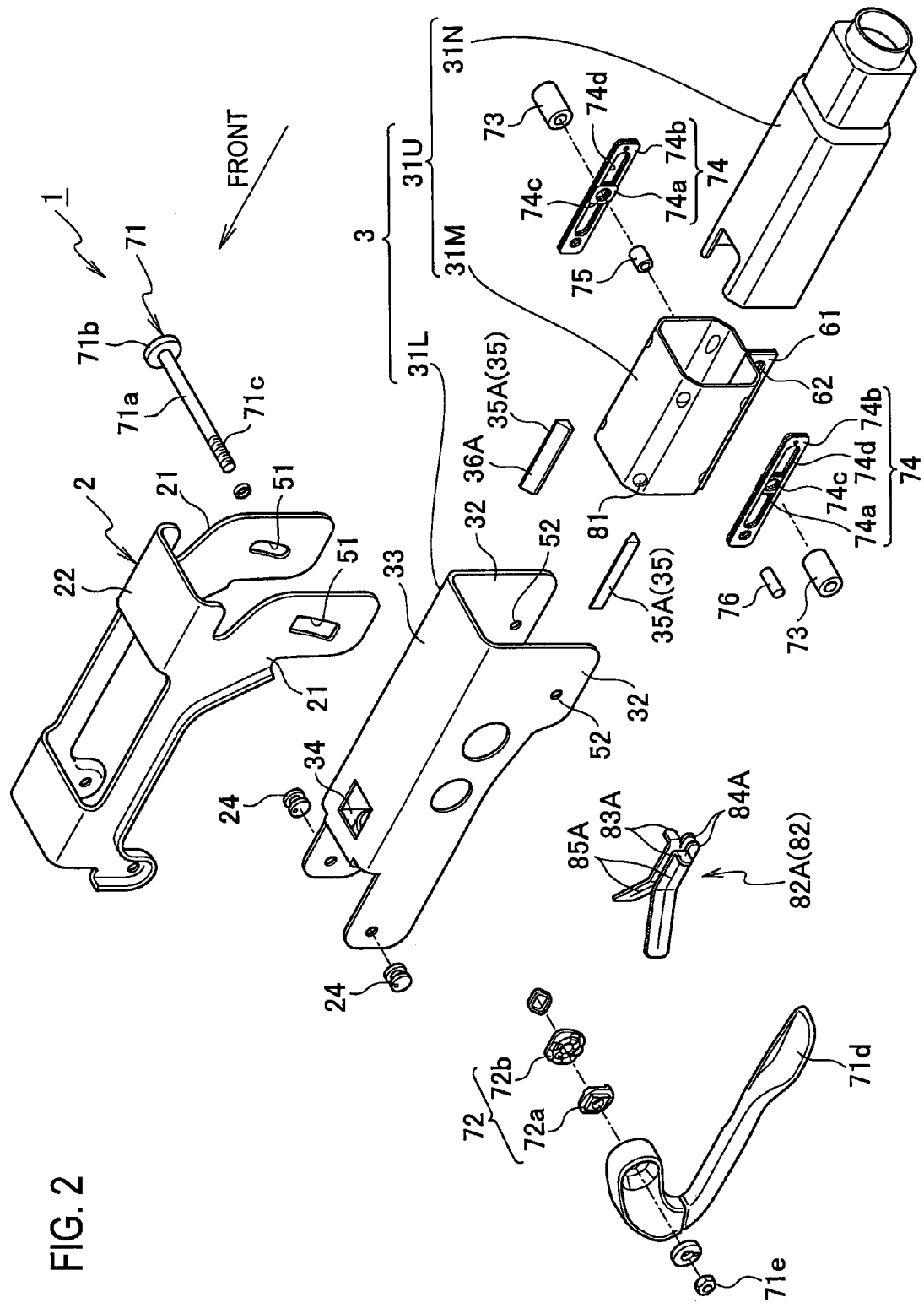
FIG. 2 is an exploded perspective view of the steering column assembly according to the first embodiment.
Figure 3:
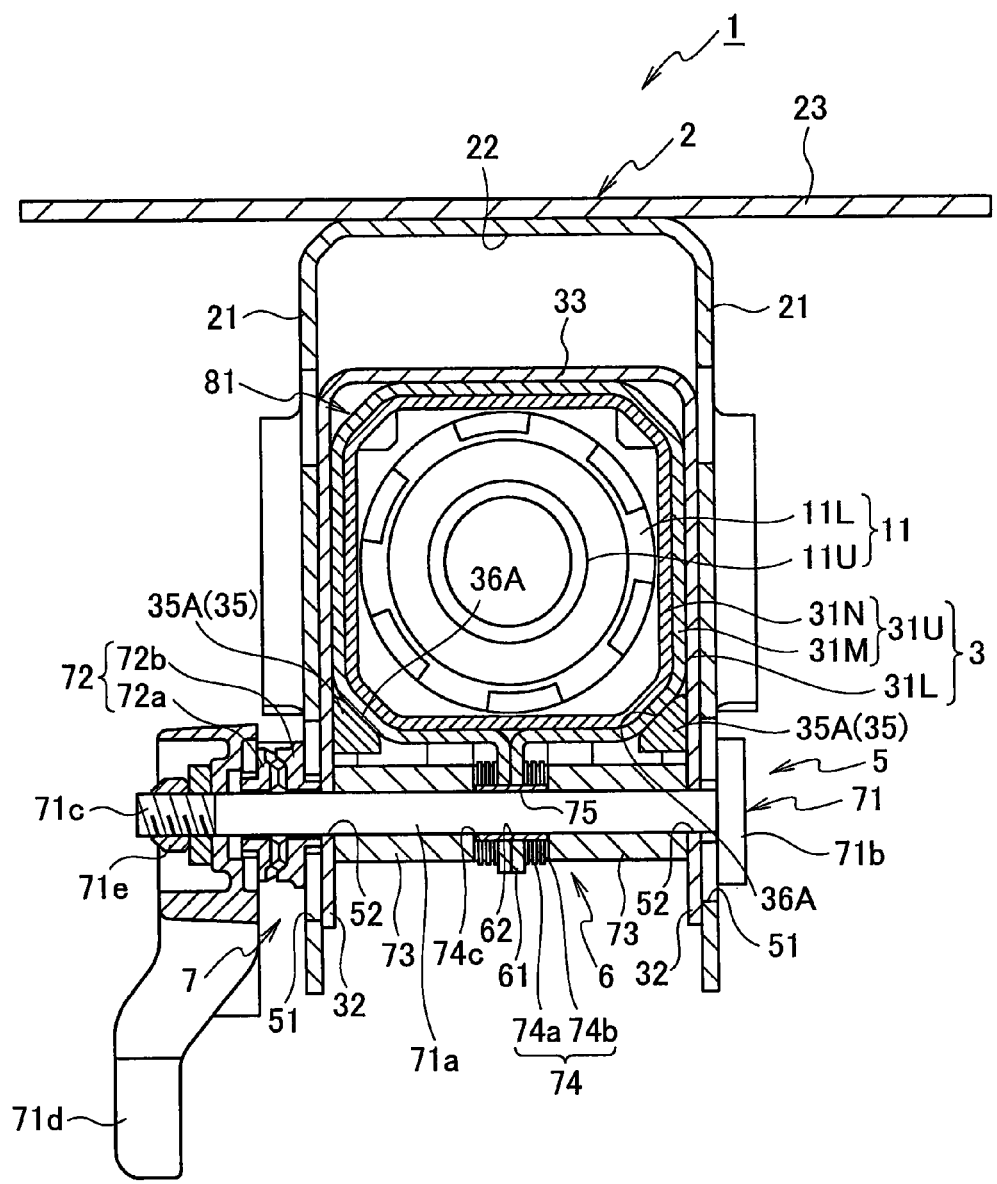
FIG. 3 is a cross-sectional view of the steering column assembly according to the first embodiment.

As shown in FIGS. 1 to 3, a steering column assembly 1 according to the present embodiment includes a support bracket 2 that attaches the assembly 1 to a vehicle body (not shown in the drawings), a steering column 3 supported by the support bracket 2, and a steering shaft 11 rotatably supported in the steering column 3. A steering wheel (not shown in the drawings) is attached an upper end (along an axial direction) of the steering shaft 11.

The steering column assembly 1 according to the present embodiment also includes a tilt adjustment mechanism 5, a telescopic adjustment mechanism 6, a lock mechanism 7, and an impact absorption mechanism 8. The tilt adjustment mechanism 5 enables the steering wheel to swing in a tilt direction. The telescopic adjustment mechanism 6 enables the steering wheel to slide in a telescopic direction (i.e. the axial direction of the steering shaft 11). The lock mechanism 7 locks a tilt/telescopic position of the steering wheel. A driver can set (move and then fix) a tilt/telescopic position of the steering wheel at his/her desired position by using these mechanisms 5 to 7. The impact absorption mechanism 8 absorbs impact energy of a secondary collision.

The support bracket 2 is (to be) extended parallel to a longitudinal (front-to-rear) direction of a vehicle, and formed of a pair of side plates 21 extended downward (vertically) and a top plate 22 connecting upper edges of the side plates 21 to have an almost reversed U-shape when viewed from in its longitudinal direction. The top plate 22 is (to be) fixed to the vehicle body via flat attachment plates 23 by bolts (not shown in the drawings) or the like. Note that, in the present embodiment, a hole is formed at the center of the top plate 22 (see FIG. 2) and the attachment plates 23 are welded on the top plate 22. A tilt pivot member 24 is provided at each front end of the side plates 21 to form a tilt axis X (to be) extended along a lateral (left-to-right) direction of the vehicle. The tilt pivot members 24 support an after-described lower jacket 31L.

The steering column 3 includes a lower jacket 31L (to be) located on a front side of the vehicle, and an upper jacket 31U (to be) located on a rear side of the vehicle.

The lower jacket 31L is formed of a pair of jacket side plates 32 disposed parallel to the side plates 21 and a jacket top plate 33 connecting upper edges of the jacket side plates 32 to have an almost reversed U-shape when viewed from in its longitudinal direction. Front ends of the jacket side plates 32 are pivotally coupled with the support bracket 2 via the tilt pivot members 24 to form the tilt axis X. Therefore, the lower jacket 31L can swing about the tilt axis X between the side plates 21. A shaft support tab 34 is extended downward from a front edge of the jacket top plate 33 so as to be perpendicular to an axial direction of the steering shaft 11. A bearing (not shown in the drawings) is attached on the shaft support tab 34, and thereby the shaft support tab 34 supports the steering shaft 11 rotatably via the bearing. Guide members 35A that serve as guide elements 35 are fixed (e.g. welded) on inner surfaces of the jacket side plates 32, respectively.

Each of the guide members 35A has a shape of an almost isosceles right triangle prism. Its sloped surface facing to the upper jacket 31U is formed as a guide surface 36A. The guide surface(s) 36A is sloped so as to be slidably contacted with the intermediate jacket 31M (the upper jacket 31U) from obliquely beneath (on an opposite side to the jacket top plate 33), and one of surfaces of the guide member 35A is fixed on the inner surface of the side plate 21 so as to extend the guide member 35A along the telescopic direction. When the pair of side plates 21 is fastened by the lock mechanism 7 provided with an after-described lock bolt 71, a width between the side plates 21 is made narrower and thereby a width between the jacket side plates 32 is also made narrower. Therefore, the upper jacket 31U is moved upward by the pair of the guide surfaces 36A and pushed onto the jacket top plate 33. As the result, a rickety movement of the upper jacket 31U in the lower jacket 31L can be restricted.

The upper jacket 31U is formed of an inner jacket 31N and an intermediate jacket 31M. The inner jacket 31N has a shape of an almost octagonal prism, and provided with a bearing(s) (not shown in the drawings) therein to support the steering shaft 11 rotatably via the bearing(s). In addition, the inner jacket 31N is inserted into the intermediate jacket 31M having an almost identical (but, minutely larger) cross-sectional shape to a cross-sectional shape of the inner jacket 31N in a press fit manner, and thereby the inner jacket 31N and the intermediate jacket 31M are integrated with each other to configure the upper jacket 31U. The upper jacket 31U is coupled with the lower jacket 31L slidably in the telescopic direction (under a condition where the rickety movement of the upper jacket 31U in the lower jacket 31L is not restricted).

The steering shaft 11 is made up of a lower shaft 11L disposed on a front side of the vehicle and supported by the lower jacket 31L, and an upper shaft 11U disposed on a rear side of the vehicle and supported by the upper jacket 31U. The lower shaft 11L and the upper shaft 11U are spline-coupled with each other so as to enable their telescopic movement in the axial direction of the steering shaft 11 and their integrated rotation about the axis of the steering shaft 11.

The tilt adjustment mechanism 5 is provided between the support bracket 2 and the lower jacket 31L. Elongated tilt holes 51 are formed on the side plates 21 of the support bracket 2, respectively. Each of the elongated tilt holes 51 is a through hole curved about the tilt axis X. Through holes 52 are formed on the jacket side plates 32 of the lower jacket 31L. Each of the through holes 52 is a circular hole through which the after-described lock bolt 71 is inserted. The lock bolt 71 is inserted through the elongated tilt holes 51 and the through holes 52, and thereby the lock bolt 71 can move along the elongated tilt holes 51. Therefore, a rear portion of the lower jacket 31L can swing about the tilt axis X within a range of the elongated tilt holes 51.

The telescopic adjustment mechanism 6 is provided between the lower jacket 31L and the intermediate jacket 31M (the upper jacket 31U). A support flange 61 is formed at the bottom center of the intermediate jacket 31M so as to be extended parallel to the jacket side plates 32 in the telescopic direction. An elongated telescopic hole 62 is formed on the support flange 61. The elongated telescopic hole 62 is a through hole elongated in the telescopic direction. The lock bolt 71 is inserted also through the elongated telescopic hole 62, and attached to the lower jacket 31L at the through holes 52. Therefore, the upper jacket 31U including the intermediate jacket 31M can slide, relative to the lock bolt 71 (the lower jacket 31L), along the telescopic direction X within a range of the elongated telescopic hole 62.

The lock mechanism 7 includes a lock cam 72 disposed on an axis of the lock bolt 71, spacers 73, and friction plates 74.

The lock bolt 71 includes an axial rod 71a having a round-bar shape, a head 71b formed at one end of the axial rod 71a and having a flange shape, and a threaded portion 71c formed on another end of the axial rod 71a. As shown in FIG. 3, the lock bolt 71 is inserted, from the other end on which the threaded portion 71c is formed, into the support bracket 2 (the elongated tilt holes 51), the lower jacket 31L (the through holes 52) and the upper jacket 31U (the elongated telescopic hole 62) from the right side in FIG. 3, and then the lock cam 72 and a lever 71d are attached to the other end by mounting a nut 71e on the threaded portion 71c.

The lock cam 72 is composed of a rotatable cam disk 72a and a fixed cam disk 72b that are faced oppositely to each other. The rotatable cam disk 72a is integrated with the lever 71$d$, and rotated about the axis of the lock bolt 71 together with the lever 71$d$. The fixed cam disk 72$b$ is coupled with the elongated tilt hole 51 slidably in the elongated tilt hole 51, and its rotation about the axis of the lock bolt 71 is restricted.

Each of the spacers 73 has a hollow cylindrical shape, and is disposed between the jacket side plate 32 and the support flange 61 with the lock bolt 71 being inserted therethrough. Between the support flange 61 and each of the spacers 73, the friction plate 74 made up of plural pairs of a fixed friction sheet 74$a$ and a slidable friction sheet 74$b$ is provided. The lock bolt 71 is inserted also into holes 74$c$ and 74$d$ formed on the fixed friction sheets 74$a$ and the slidable friction sheets 74$b$. The lock bolt 71 is further inserted into a dumper cylinder 75 provided between the spacers 73. Namely, the dumper cylinder 75 is provided at a position where the support flange 61 is sandwiched by the friction plates 74.

Each of the fixed friction sheets 74$a$ is made of a thin sheet having an almost square flat-washer shape, and a friction through hole 74$c$ is formed at the center of each of the fixed friction sheets 74$a$.

Each of the slidable friction sheets 74$b$ is made of a rectangular thin sheet. An elongated friction hole 74$d$ having an identical shape to the shape of the elongated telescopic hole 62 is formed on each of the slidable friction sheets 74$b$ along its longitudinal direction. The slidable friction sheets 74$b$ are anchored to a front end of the support flange 61 by a pin 76, and slidable together with the support flange 61 (the upper jacket 31U) relative to the lock bolt 71 (the lower jacket 31L). While the lock mechanism 7 doesn't lock the steering column 3, the slidable friction sheets 74$b$ can be displaced minutely in the axial direction of the lock bolt 71, but their minute displacements are restricted while the lock mechanism 7 locks the steering column 3. In each of the friction plates 74, the first fixed friction sheet 74$a$ is contacted with a surface of the support flange 61, and then the slidable fixed sheets 74$b$ and the fixed friction sheets 74$a$ are stacked alternately thereon so that each of the friction plates 74 includes the same numbers of the fixed friction sheets 74$a$ and the slidable fixed sheets 74$b$.

The dumper cylinder 75 is made of synthetic resign and has an outline dimension that enables its slide within the elongated telescopic hole 62. The dumper cylinder 75 eliminates a metallic noise that may be generated when the lock bolt 71 hits an inner end edge of the elongated telescopic hole 62, by preventing the lock bolt 71 from directly contacting with the inner end edge of the elongated telescopic hole 62.

In the lock mechanism 7, the rotatable cam disk 72$a$ and the fixed cam disk 72$b$ are engaged with each other when the lever 71$d$ is operated to its lock position, and thereby a distance between the fixed cam disk 72$b$ and the head 71$b$ of the lock bolt 71 is made narrower. As the result, the pair of the side plates 21 of the support bracket 2 is fastened so as to be made closer to each other, and the pressing forces are generated between the support bracket 2 and the lower jacket 31L and between the lower jacket 31L and the intermediate jacket 31M. Due to these pressing forces, the lower jacket 31L and the upper jacket 31U are fixed with the support bracket 2.

The impact absorption mechanism 8 includes mechanical fuses 81 and an impact absorber 82.

Each of the mechanical fuses 81 is provided between the inner jacket 31N and the intermediate jacket 31M, and restricts sliding of the inner jacket 31N in the telescopic direction relative to the intermediate jacket 31M under a normal condition where no impact load is applied thereto. When an impact load (impact energy) more than a preset load is applied to the inner jacket 31N in the telescopic direction due to a secondary impact or the like, the mechanical fuses 81 allows the inner jacket 31N to slide in the telescopic direction relative to the intermediate jacket 31M.

In the present embodiment, the mechanical fuses 81 utilize static frictional forces applied (a static friction coefficient) between the intermediate jacket 31M and the inner jacket 31N that is inserted into the intermediate jacket 31M in a press-fit manner. Specifically, as shown in FIG. 2, four bulges protruded inward and formed along a circumference of one end of the intermediate jacket 31M and similar four bulges formed along a circumference of another end of the intermediate jacket 31M function as the mechanical fuses 81. The eight bulges are pressed onto an outer circumferential surface of the inner jacket 31N to generate the static frictional forces.

The impact absorber 82 absorbs the impact energy applied to the inner jacket 31N while the inner jacket 31N slides in the telescopic direction. Note that, in the present embodiment, the impact absorber 82 is composed of a first impact absorber and a second impact absorber.

The first impact absorber is a collapsible structure of the upper jacket 31U. The collapsible structure absorbs the impact energy by utilizing dynamic frictional forces applied (a dynamic friction coefficient) between the intermediate jacket 31M and the inner jacket 31N while the inner jacket 31N slides in the intermediate jacket 31M (while the upper jacket 31U is collapsed).

The second impact absorber is a pair of ripping plates 82A. Each of the ripping plate 82A is an angled rectangular metallic plate, and provided with a movable end 83A and an anchored end 84A that are formed at one end along its longitudinal direction. In each of the ripping plates 82A, the movable end 83A and the anchored end 84A are aligned at the one end along a width direction of the ripping plate 82A (i.e. aligned vertically). A groove 85A is formed from a position between the movable end 83A and the anchored end 84A toward another end of the ripping plate 82A. The groove 85A doesn't reach to an edge of the other end. The anchored ends 84A are fixed on a front end of the support flange 62, and the movable ends 83A are fixed with a front end of the inner jacket 31N.

While the inner jacket 31N slides in the intermediate jacket 31M, the movable ends 83A (fixed with the inner jacket 31N) are moved forward relative to the anchored end 84A (fixed with the intermediate jacket 31M) and thereby the ripping plates 82A are ripped along the grooves 85A and bent. Therefore, the ripping plates 82A absorb the impact energy by being ripped and bent.

According to the above-described configurations, when the lever 71$d$ is operated to its unlock position, cam protrusions of the rotatable cam disk 72$a$ are engaged with cam depressions of the fixed cam disk 72$b$, and thereby a thickness of the lock cam 72 along the axial direction of the lock bolt 71 becomes smaller to widen a distance between the side plates 21 of the support bracket 2. Therefore, the pressing force generated between the support bracket 2 (the side plates 21) and the lower jacket 31L (the jacket side plates 32) is released, and thereby a tilt position of the lower jacket 31L (the steering column 3) can be adjusted. In addition, the pressing force generated between the lower jacket 31L (the jacket side plates 32) and the intermediate jacket 31M (the support flange 61 via the spacers 73) is also released, and thereby a telescopic position of the upper jacket 31U (the steering column 3) can be adjusted.

On the other hand, when the lever 71$d$ is operated to its lock position, the cam protrusions of the rotatable cam disk 72$a$ are oppositely contacted with cam protrusions of the fixed cam disk 72$b$, and thereby the thickness of the lock cam 72 along the axial direction of the lock bolt 71 becomes larger to narrow the distance between the side plates 21 of the support bracket 2 (i.e. the side plates 21 of the support bracket 2 are fastened). Therefore, the pressing force is generated between the support bracket 2 (the side plates 21) and the lower jacket 31L (the jacket side plates 32), and thereby the tilt position of the lower jacket 31L (the steering column 3) is locked. In addition, the pressing force is also generated between the lower jacket 31L (the jacket side plates 32) and the intermediate jacket 31M (the support flange 61 via the spacers 73), and thereby the telescopic position of the upper jacket 31U (the steering column 3) is locked.

If a an impact load (impact energy) more than a preset load (i.e. more than the static frictional forces applied between the intermediate jacket 31M and the inner jacket 31N) is input to the upper jacket 31U in the telescopic direction due to a secondary impact or the like in the above-described lock state (a state where the lock mechanism 7 fastens the side plates 21), the inner jacket 31N is slid relative to the intermediate jacket 31M in the telescopic direction. While the inner jacket 31N is slid relative to the intermediate jacket 31M, the collapsible structure of the upper jacket 31U that serves as the first impact absorber (the dynamic frictional forces applied between the intermediate jacket 31M and the inner jacket 31N) and the ripping plates 82A that serve as the second impact absorber (ripping and bending the ripping plates 82A) absorb the impact energy.

According to the above-described configurations, the side plates 21 of the support bracket 2, the jacket side plates 32 of the lower jacket 31L, and the support flange 61 of the upper jacket 31U (the intermediate jacket 31M) can be pressed onto each other and thereby fixed with each other by fastening the side plates 21 by use of the lock mechanism 7. Therefore, dispersion of a force required for fastening the side plates 21 can be reduced, and a force required for operating the lever 71d can be made stable. In addition, since planes perpendicular to the axial direction of the lock bolt 71 are fastened, a force for supporting and retaining the upper jacket 31U can be made stable, too.

Further, since the steering column 3 is locked by pressing the upper jacket 31U (the intermediate jacket 31M) and the lower jacket 31L onto each other along the axial direction of the lock bolt 71, a rickety movement of the upper jacket 31U in the lower jacket 31L can be restricted. Furthermore, fastening rigidity of the steering column 3 in the tilt and telescopic directions can be enhanced and made stable.

According to the above-described configurations, the guide members 35A push the upper jacket 31U (the intermediate jacket 31M) upward when the side plates 21 are fastened by the lock mechanism 7, so that the upper jacket 31U is pressed onto the jacket top plate 33. Therefore, a gap between the upper jacket 31U and the lower jacket 31L is eliminated, and thereby the rickety movement of the upper jacket 31U in the lower jacket 31L can be restricted more effectively.

In addition, the guide members 35A are provided integrally with the jacket side plates 32, respectively, and thereby the guide members 35A function as guide rails for guiding the upper jacket 31U (the intermediate jacket 31M) along the telescopic direction. Therefore, slidability of the upper jacket 31U (the intermediate jacket 31M) can be improved, and the rickety movement of the upper jacket 31U in the lower jacket 31L can be restricted more effectively when the steering column 3 is locked.

Further, by using the friction plates 74, fastening rigidity of the upper jacket 31U in the telescopic direction can be enhanced compared with a configuration where the support flange 61 may be directly sandwiched by the spacers 73.

Furthermore, the friction plates 74 are interposed between the support flange 61 and the spacers 73, respectively, so that the friction plates 74 can be provided without increasing a size (width) of the steering column assembly 1 along the axial direction of the lock bolt 71 (without increasing the distance between the side plates 21). Also it becomes possible to increase the number of the friction sheets 74a and 74b included in the friction plate(s) 74 [that serves as a fastening force enhancer] without increase a size (width) of the steering column assembly 1 along the axial direction of the lock bolt 71. Therefore, fastening rigidity of the upper jacket 31U in the telescopic direction can be easily adjusted by adjusting the number of friction sheets, and thereby the fastening rigidity can be enhanced further.

The fastening force caused when the lock mechanism 7 fastens the side plates 21 is not applied to the mechanical fuses 81. Therefore, a load for collapsing the steering column 3 (for sliding the inner jacket 31N relative to the intermediate jacket 31M) due to a secondary impact or the like becomes stable, so that it becomes possible to absorb the impact energy stably.

In the above-described configuration, the mechanical fuses 81 utilizes the friction forces generated by inserting the inner jacket 31N into the intermediate jacket 31M in a press fit manner. Therefore, the mechanical fuses 81 can be provided compactly without increasing the number of parts (components).

In addition, the impact absorber 82 can be provided compactly by providing the ripping plate(s) 82A while fixing its anchored end 84A with the support flange 61 and fixing its movable end 83A with the upper jacket 31U.

As described above, the friction plates 74 are used as the fastening force enhancer in the present embodiment. However, the fastening force enhancer is not limited to this configuration. For example, the fastening rigidity of the upper jacket 31U may be enhanced by forming rack teeth on both sides of the elongated telescopic hole 62 on both surfaces of the support flange 61 and also forming lock teeth on end surfaces of the spacers 73 that are opposite to the rack teeth. Then the steering column 3 is locked, the rack teeth and the lock teeth are engaged with other to enhance the fastening rigidity of the upper jacket 31U.

Second Embodiment

Figure 4:
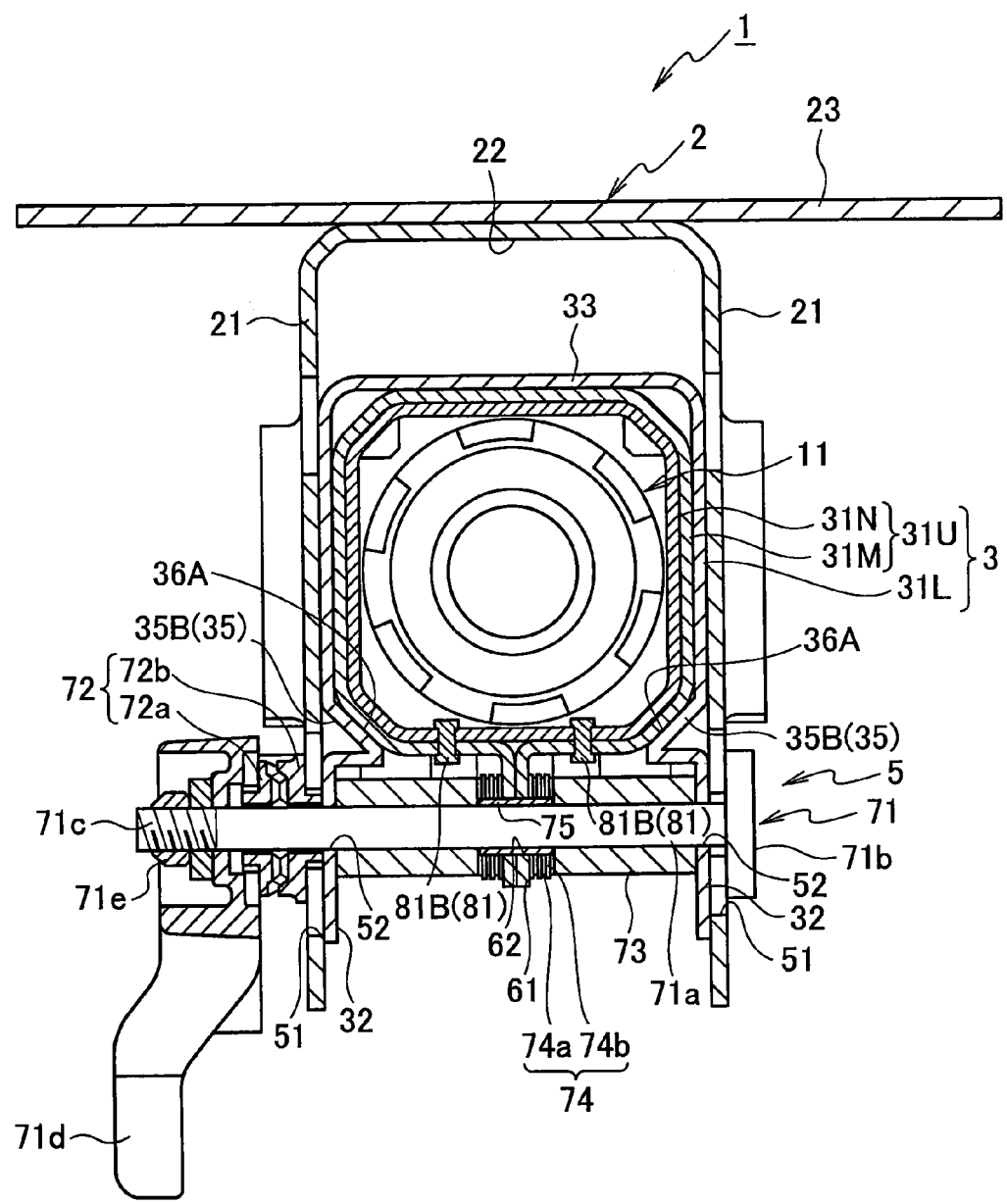
FIG. 4 is a cross-sectional view of a steering column assembly according to a second embodiment.

A steering column assembly 1 according to a second embodiment shown in FIG. 4 is different from the steering column assembly 1 according to the first embodiment in configurations of the guide elements 35 and the mechanical fuses 81. Other configurations are identical to those in the first embodiment. Therefore, identical and equivalent components in the present embodiment are labeled with identical reference numbers to those in the first embodiment, and their redundant descriptions will be omitted.

The guide elements 35 in the present embodiment are provided as guide beads 35B formed by a press work on the jacket side plates 32. Each of the guide beads 35B is protruded inward and is extended along the telescopic direction, and has the guide surface 36A similarly to the guide member 35A in the first embodiment. The guide beads 35B are arranged on the jacket side plates 32 so that they clamp the intermediate jacket 31M and then contact with the intermediate jacket 31M (the upper jacket 31U) from obliquely beneath (on an opposite side to the jacket top plate 33) similarly to the guide members 35A in the first embodiment.

The mechanical fuses 81 in the present embodiment are provided as shear pins 81B that couple the intermediate jacket 31M with the inner jacket 31N. Note that the inner jacket 31N in the present embodiment inserted into the intermediate jacket 31M so as to be slidable freely in the telescopic direction in the intermediate jacket 31M. The shear pins 81B are arranged at lapped portions of the intermediate jacket 31M and the inner jacket 31N to build the upper jacket 31U by coupling the intermediate jacket 31M with the inner jacket 31N. A material and a dimension of the shear pin(s) 81B is determined so that the shear pin(s) 81B is fractured when an impact load (impact energy) more than a preset load is applied to the inner jacket 31N in the telescopic direction due to a secondary impact or the like. The fractures of the shear pins 81B make the intermediate jacket 31M decoupled (separated) with the inner jacket 31N, and thereby the inner jacket 31N is made slidable in the telescopic direction relative to the intermediate jacket 31M. Note that the inner jacket 31N may be inserted into the intermediate jacket 31M in a press fit manner also in the present embodiment similarly in the first embodiment.

According to the above-described configurations, the guide beads 35B are integrally formed on the jacket side plates 32 by a press work. Therefore, an assembling process (e.g. welding) of the guide elements 35 is not needed, in addition to the advantages brought by the first embodiment.

In addition, the mechanical fuses 81 are provided as the shear pins 81B coupling the intermediate jacket 31M with the inner jacket 31N, so that the mechanical fuses 81 can be disposed (provided) compactly without making the configurations of the steering column assembly 1 complicated.

Third Embodiment

Figure 5:
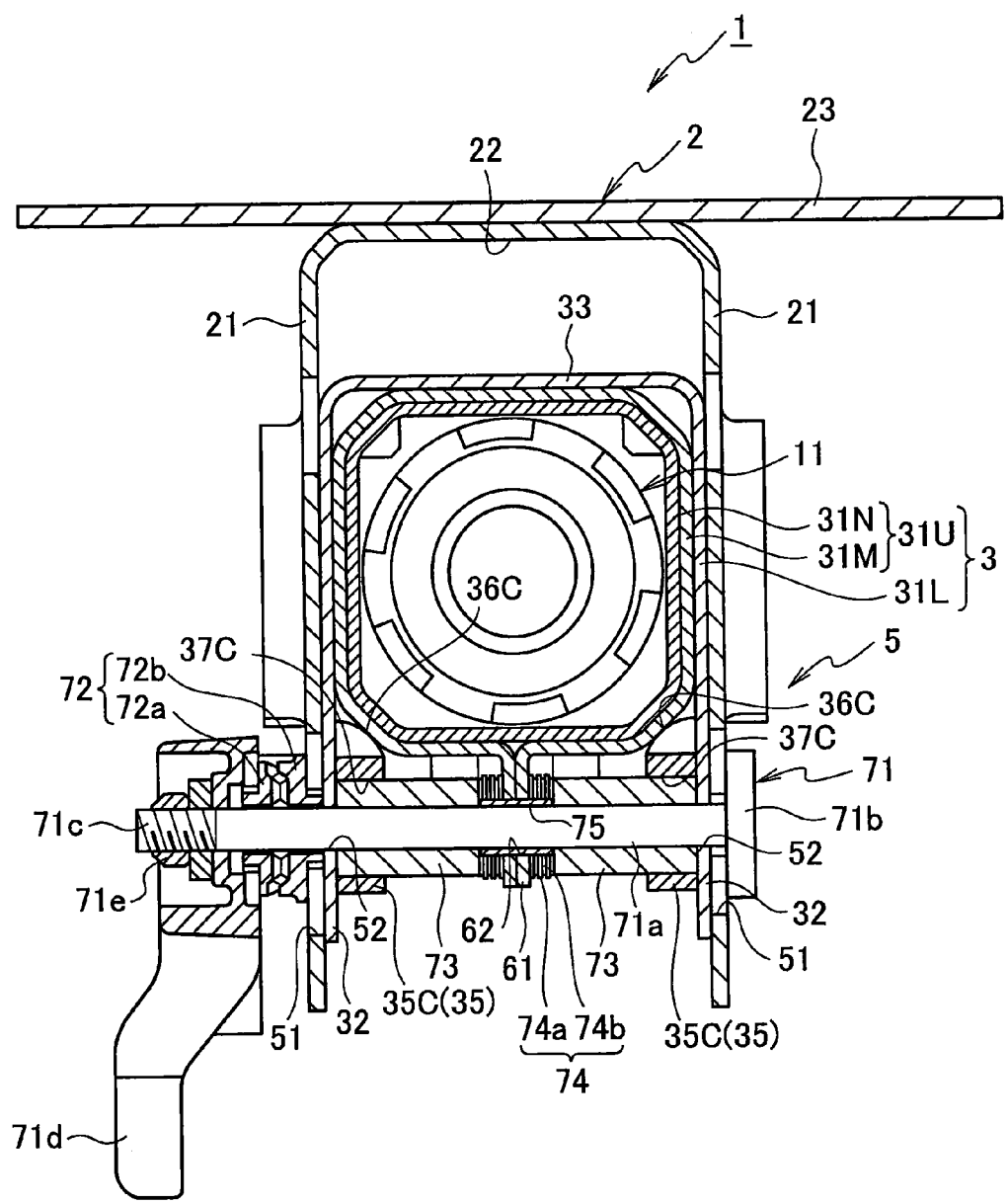
FIG. 5 is a cross-sectional view of a steering column assembly according to a third embodiment.

A steering column assembly 1 according to a third embodiment shown in FIG. 5 is different from the steering column assembly 1 according to the first embodiment in configurations of the guide elements 35. Other configurations are identical to those in the first embodiment. Therefore, identical and equivalent components in the present embodiment are labeled with identical reference numbers to those in the first embodiment, and their redundant descriptions will be omitted.

Figure 6:
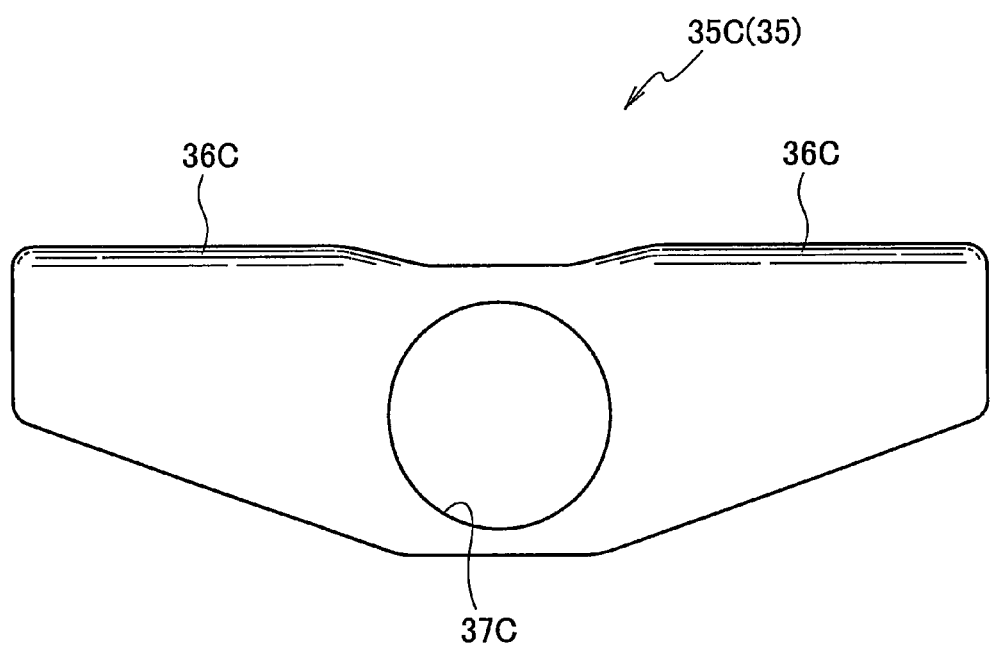
FIG. 6 is a side view of a guide member in the third embodiment.
Figure 7:
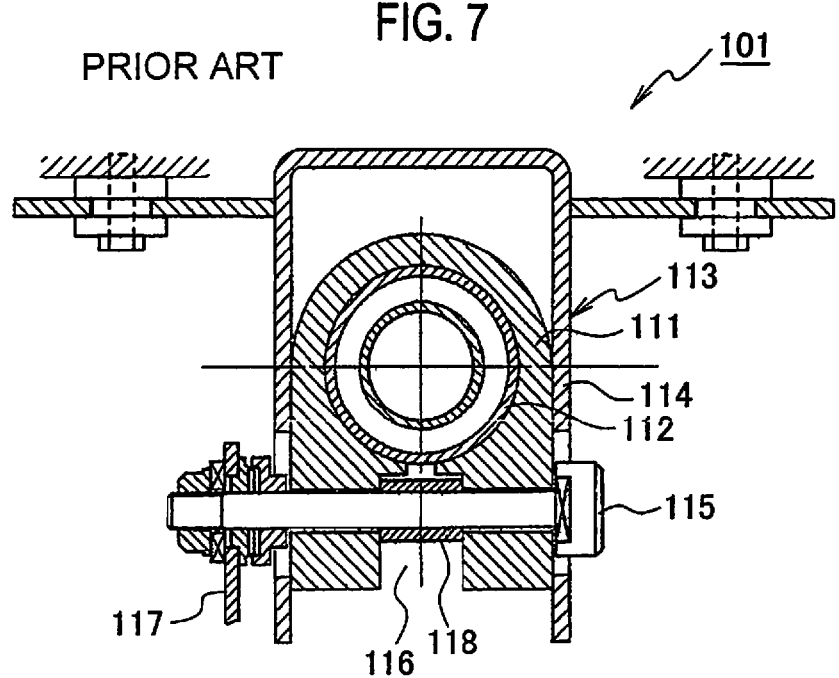
FIG. 7 is a cross-sectional view of a prior-art steering column assembly.
Figure 8:
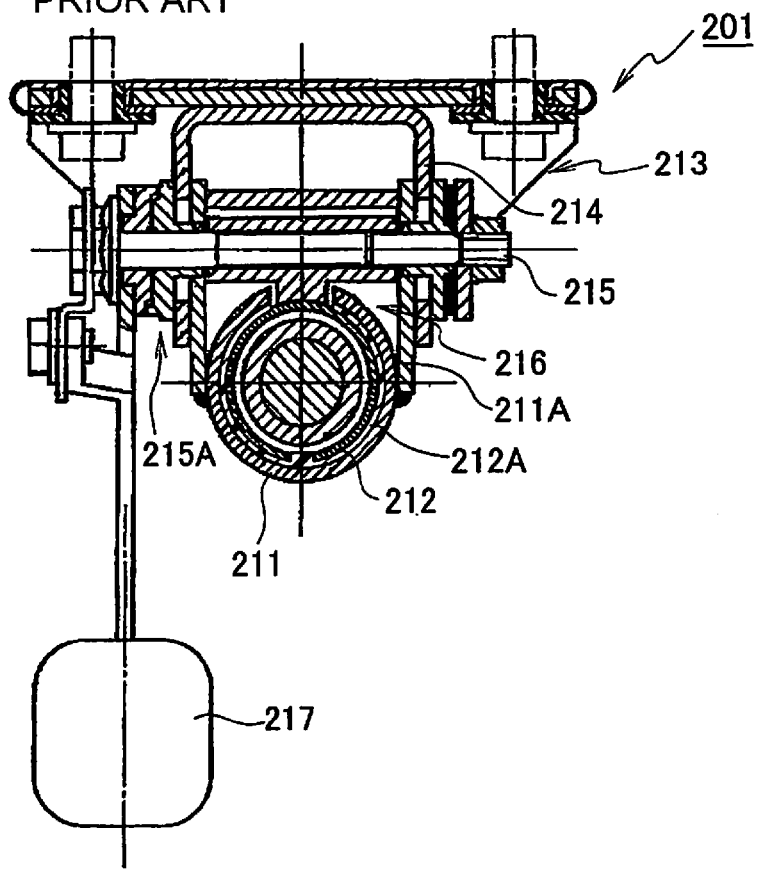
FIG. 8 is a cross-sectional view of another prior-art steering column assembly.

The guide elements 35 in the present embodiment are provided as guide plates 35C as shown in FIG. 6. Each of the guide plates 35C has an almost fish-tailfin shape. A pair of rounded guide surfaces 36C is formed along an upper edge of the guide plate(s) 35C, and a support hole 37C is formed at the center of the guide plate(s) 35C. The guide surfaces 36C are formed on both sides of the support hole 37C.

Each of the guide surface 36C is sloped curvedly so as to be slidably contacted with the upper jacket 31U from obliquely beneath, and formed as a rounded surface so as to be convex toward the upper jacket 31U.

The support hole 37C is opened so that the spacer 73 is inserted into it without making a gap therebetween. Namely, the lock bolt 71 is inserted into the support holes 37C while the spacers 73 are interposed between the lock bolt 71 and the guide plates 35C.

According to the above-described configurations, the guide plates 35C are swingably supported by the lock bolt 71 in a seesaw manner about the axis of the lock bolt 71. Therefore, the guide plates 35C can swing so that their guide surfaces 36C are contacted with the upper jacket 31U (the intermediate jacket 31M), i.e. the guide surfaces 36C are stably contacted with the upper jacket 31 when guiding the upper jacket 31U along the telescopic direction. As the result, telescopic slidability of the upper jacket 31U can be improved (a telescopic slide of the upper jacket 31U can be made smooth without prying) and the fastening rigidity of the upper jacket 31U can be made stable further, in addition to the advantages brought by the first embodiment.

In addition, the guide surface(s) 36C is sloped curvedly as a rounded surface so as to be convex toward the upper jacket 31U. Therefore, the guide plate(s) 35C is surely line-contacted with the upper jacket 31U along the telescopic direction. As the result, a rickety movement of the upper jacket 31U is restricted effectively while the guide plates 35C push the upper jacket 31U upward.

The guide element 35 (the guide plate 35C) and the spacer 73 are made independent from each other as separated parts (components) in the present embodiment. However, the guide element 35 (the guide plate 35C) and the spacer 73 may be made as a single monolithic part (component). According to this configuration, the above-described equivalent advantage can be also brought.

The spacer 73 is inserted into the support hole 37C formed on the guide element 35 (the guide plate 35C), namely, the spacer 73 penetrates the guide plate 35C in the present embodiment. However, it is possible that the lock bolt 71 is inserted through the support hole 37C formed on the guide element 35 (the guide plate 35C) and the guide plate 35C is clamped by the jacket side plate 32 and the spacer 73 so as to be held between the jacket side plate 32 and the spacer 73. According to this configuration, the above-described equivalent advantage can be also brought.

The present invention is not limited to the above-described embodiments, and it is possible to embody the present invention by modifying its components in a range that does not depart from the scope thereof. Further, it is possible to form various kinds of inventions by appropriately combining a plurality of components disclosed in the above-mentioned embodiments. For example, it may be possible to omit several components from all of the components shown in the above-mentioned embodiment.

In addition, for example, the guide surface(s) 35A in the first or second embodiment may be sloped curvedly as a rounded surface so as to be convex toward the upper jacket 31U similarly to the guise surface(s) 36C in the third embodiment.

What is claimed is:

1. A steering column assembly comprising:
   a support bracket that is to be fixed to a vehicle body and is provided with a pair of side plates extended vertically;
   a lower jacket that is provided with a pair of jacket side plates extended vertically and pivotally coupled with the support bracket so as to be supported by the support bracket swingably about a tilt axis;
   an upper jacket that is provided with a support flange extended parallel to the pair of jacket side plates of the lower jacket and is coupled with the lower jacket so as to be slidable between the pair of jacket side plates in a telescopic direction extending along an axial direction of a steering shaft;
   spacers disposed between the support flange of the upper jacket and the pair of jacket side plates of the lower jacket, respectively; and
   a lock mechanism that includes a lock bolt inserted through elongated tilt holes formed on the pair of side plates of the support bracket, through holes formed on the pair of jacket side plates of the lower jacket, and an elongated telescopic hole formed on the support flange of the upper jacket along the telescopic direction,
   wherein the lock mechanism fastens the pair of side plates of the support bracket to press and fix the pair of jacket side plates of the lower jacket, and to press and fix the support flange of the upper jacket via the spacers.

2. The steering column assembly according to claim 1, wherein
   the lower jacket is provided with a jacket top plate that connects the pair of jacket side plates,
   a pair of guide elements is provided between the pair of jacket side plates and the upper jacket, each of the pair of guide elements being provided with a guide surface that is sloped so as to be slidably contacted with the upper jacket, and
   a width between the pair of jacket side plates is made narrower when the pair of jacket side plates is fastened by the lock mechanism to push the upper jacket onto the jacket top plate by the pair of guide elements.

3. The steering column assembly according to claim 2, wherein
   each of the pair of guide elements is a guide member that has a triangle prism shape and is fixed on an inner surface of the pair of jacket side plate so as to be extended along the telescopic direction, and
   one of surfaces of the guide member is the guide surface that is sloped and is slidably contacted with the upper jacket on an opposite side to the jacket top plate.

4. The steering column assembly according to claim 2, wherein
   each of the guide elements is a guide bead that is integrally formed on the jacket side plate by a press work so as to be protruded inward and extended along the telescopic direction, and
   one of surfaces of the guide bead is the guide surface that is sloped and is slidably contacted with the upper jacket on an opposite side to the jacket top plate.

5. The steering column assembly according to claim 2, wherein
   each of the guide elements is a guide plate that is disposed between the jacket side plate and the support flange so as to be swingable about the lock bolt, and
   one of surfaces of the guide plate is the guide surface that is sloped and is slidably contacted with the upper jacket on an opposite side to the jacket top plate.

6. The steering column assembly according to claim 2, wherein
   the guide surface is sloped curvedly as a rounded surface so as to be convex toward the upper jacket.

7. The steering column assembly according to claim 1, further comprising
   a fastening force enhancer provided between the support flange and the spacers to enhance a fastening force for restricting the support flange from sliding in the telescopic direction while the pair of side plates is fastened by the lock mechanism.

8. The steering column assembly according to claim 7, wherein
   the fastening force enhancer is a friction plate that includes at least one pair of a fixed friction sheet provided with an elongated friction hole that is lined up with the elongated telescopic hole of the support flange and through which the lock bolt is inserted, and a slidable friction sheet provided with a friction through hole through which the lock bolt is inserted,
   the fixed friction sheet and the slidable friction sheet are stacked alternately on the support flange, and
   one end of the fixed friction sheet is anchored to the support flange.

* * * * *